Oct. 22, 1968  H. DREYER  3,406,915
FERTILIZER SPREADING APPARATUS
Filed Feb. 16, 1965
3 Sheets-Sheet 1

INVENTOR
HEINZ DREYER
BY
ATTORNEYS.

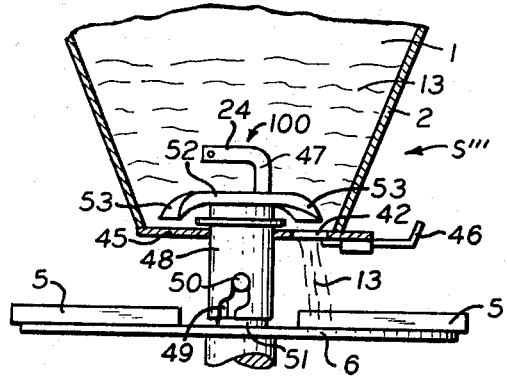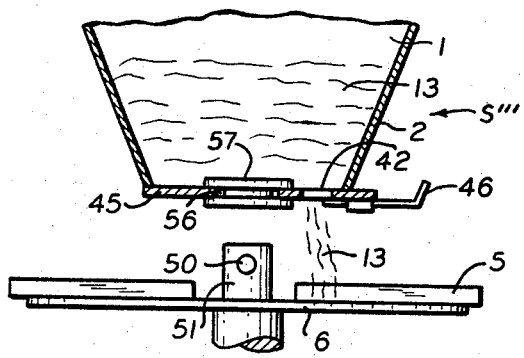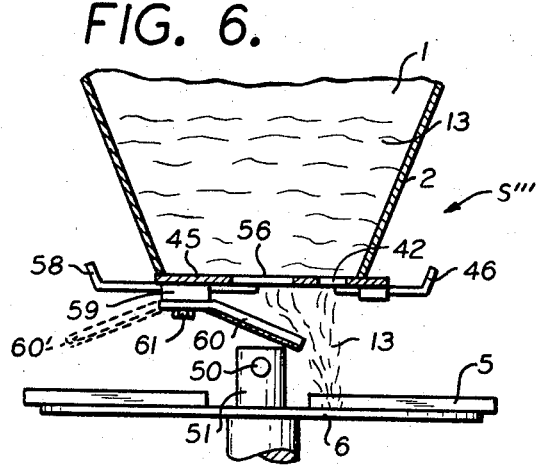

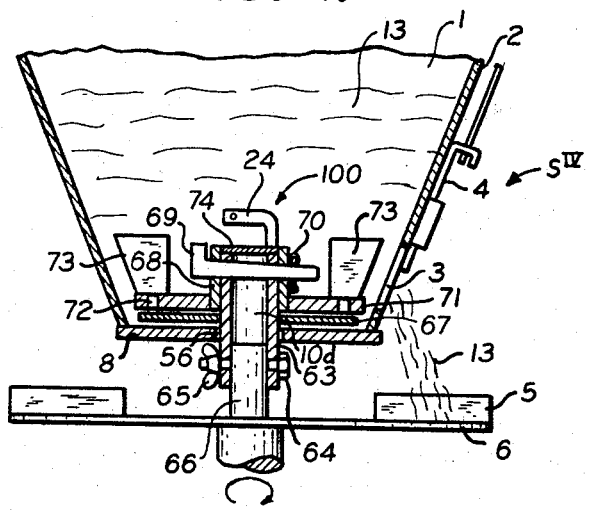
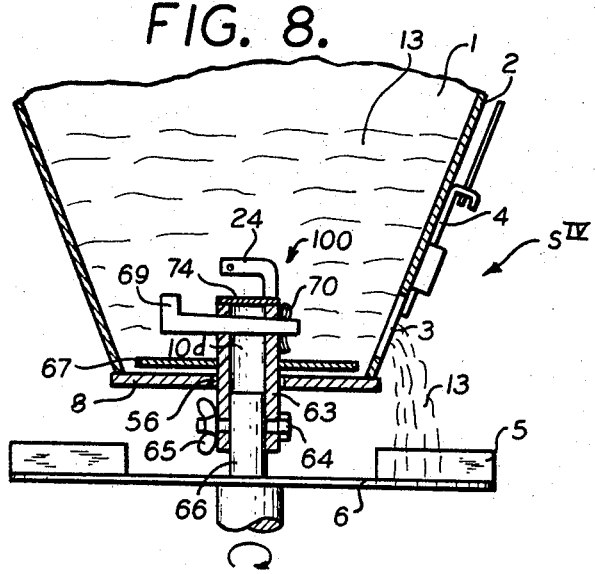

United States Patent Office 3,406,915
Patented Oct. 22, 1968

3,406,915
FERTILIZER SPREADING APPARATUS
Heinz Dreyer, near Osnabruck, Germany, assignor to Amazonen-Werke H. Dreyer, Osnabruck, Germany, a corporation of Germany
Filed Feb. 16, 1965, Ser. No. 433,069
Claims priority, application Germany, Feb. 18, 1964,
A 45,259
3 Claims. (Cl. 239—683)

This invention relates in general to apparatus for dispensing and spreading fertilizers and similar materials, and more particularly to a fertilizer spreading apparatus which is equipped with a hopper from which fertilizer flows through one or more orifices onto a rotating spreader plate and is dispensed therefrom by centrifugal force.

In general, the apparatus of the instant invention is adapted for spreading fertilizer in various particulate solid states ranging from fine granular powders up to aggregate clumps, as well as in the liquid state.

To permit the apparatus according to the invention to be used with solid fertilizers having various consistencies, particle sizes, and cohesion properties, a rotatable stirring device is provided within the hopper to aid in feeding fertilizer through each orifice thereof, which in the absence of such a stirring device, the flow of fertilizer through the orifices would be solely by means of gravity. This stirring device can be driven by the same means used for rotating the spreader plate, or by separate drive means, if desired.

Where the fertilizer to be spread has physical properties which permit it to flow through the hopper orifices without stirring, as in the case of loose, non-caking granular fertilizers, the stirring device can be omitted.

According to the invention, the stirring device comprises a plurality of interchangeable and removable parts, such as arms, plates, vanes, etc., which can be selectably removed or added as desired or required to provide a stirring device having an impeller configuration which is most suitable for the particular fertilizer to be dispensed.

Also, the size and shape of the hopper orifices can be selectively adjusted by means of slidable gates, provided on the exterior of the hopper.

In the operation of fertilizer spreaders, it is desirable to effect a uniform fertilizer distribution pattern, and this in turn requires a substantially uniform flow of fertilizer onto the spreader plate. Hence, it is necessary to provide means for maintaining a substantially constant fertilizer flow rate through the proper orifices, either by gravity alone, or by gravity aided by appropriate stirring.

Although various types of centrifugal spreading devices are known which incorporate fertilizer feeding devices, such prior art devices are generally limited as to the type of fertilizer which can be dispensed, being suitable for uniform distribution of one fertilizer, but not for another of a different consistency and/or cohesion.

Thus, such known fertilizer spreaders frequently will give a satisfactory fertilizer distribution pattern for a free-flowing granular fertilizer, but will either be insufficient to force a caking fertilizer through the hopper discharge orifice onto the spreader device with an even flow rate, or will comminute such a fertilizer to the extent where it heats up and forms a hard cement-like caked ring on the bottom of the hopper.

Another disadvantage of such prior art fertilizer spreaders lies in the fact that their ejector means are fixedly connected to their associated driving mechanism and cannot be selectably varied in configuration to provide optimum distribution for various types of fertilizers.

The present invention proceeds upon the concept that in order to provide a fertilizer spreading apparatus which is suitable for a wide range of fertilizers, it is necessary to provide a stirring, or mixing device having an impeller comprising a plurality of stirring members, fingers, arms, and/or other elements which can be selectably assembled or removed for varying the impeller configuration in accordance with the requirements of a particular fertilizer to be dispensed. These impeller element members are moved through the fertilizer in the hopper by rotation, as for example, via a drive shaft, and coact with the said fertilizer to aid its flow through the hopper discharge orifices.

Pursuant to this concept, the aforementioned disadvantages of the known centrifugal spreaders are eliminated by using an ejector means having an impeller comprising a plurality of stirring members connected together by conventional means into an easily releasable or disengageable assembly which is likewise releasably mounted to a drive shaft, and, if desired, can be covered over by a shroud member, as for example, to permit fertilizer flow from the hopper under the influence of gravity alone, without any stirring. By this feature, it is possible to vary the configuration of the ejector means impeller, or remove it entirely, as required for optimum fertilizer distribution.

If in the case of easy-to-spread types of fertilizers an ejector means is not necessary, provision is furthermore made according to the invention so that, after the release and removal of the ejector means, only the upper stub of its driving shaft remains in the hopper. This serves to prevent the attrition, or excessive pulverization of the fertilizer grains, which in certain cases can be quite fragile.

Additional advantages are afforded by the fertilizer spreading apparatus according to the invention by reason of the fact that the connection between the ejector means and its driving shaft is located outside of the hopper, and that after the removal of the stirring device, the opening resulting in the hopper is covered by a closure member. By this feature, the coupling parts remain in a usable condition without any special maintenance since they do not come directly in contact with the fertilizer. On the other hand, even after ejector means has been removed from the hopper, fertilizer can still flow out of the hopper at a rate than can be regulated by means of a gate which controls the effective size of the discharge orifices.

In the case of one particular embodiment of the invention, the hole in the bottom of the hopper resulting from the removal of the ejector means is used as an additional fertilizer discharge orifice, and a slidable gate is provided for selectively adjusting the size of said orifice. This permits the total fertilizer flow rate from the hopper to the spreader plate to be controllably regulated so as to compensate for the effect of ejector means removal, as for example, in the case of free flowing fertilizers not requiring any stirring.

Since it is important in the case of centrifugal spreaders in order to achieve a uniform spreading pattern, that the fertilizer fed from or flowing from the hopper fall upon the spreader plate within a definite area, the invention provides for the disposition of a releasable or pivotable chute or tube underneath the opening in the hopper that is produced by removal of the ejector means.

It is therefore, an object of the invention to provide a fertilizer spreading apparatus which can accommodate a wide variety of fertilizers.

Another object of the invention is to provide a fertilizer spreading apparatus as aforesaid which produces a controllable, uniform fertilizer distribution pattern.

Still another and further object of the invention is to provide a fertilizer spreading apparatus as aforesaid which has an ejector means with an impeller that can be selectively varied in configuration, or removed entirely, if desired.

Other and further objects and advantages of the invention will appear in or become evident from the following detailed description and accompanying drawings in which:

FIG. 4 is an elevation view, partly in section, of a fertilizer spreader according to another and further embodiment of the invention in which the stirring device is releasably connected to its associated drive shaft by a bayonet connection.

FIG. 5 is an elevation view, partly in section, showing the fertilizer spreader of FIG. 4 in a configuration in which the ejector means is removed and the resulting hole in the bottom of the hopper is covered.

FIG. 6 is an elevation view, partly in section, showing the fertilizer spreader of FIG. 5 in a modified configuration, with the hole in the bottom of the hopper being used as an additional fertilizer discharge orifice.

FIG. 7 is an elevation view, partly in section, showing a fertilizer spreader according to a preferred embodiment of the invention.

FIG. 8 is an elevation view, partly in section, of the fertilizer spreader of FIG. 7, in an alternate impeller configuration.

Figure 1:
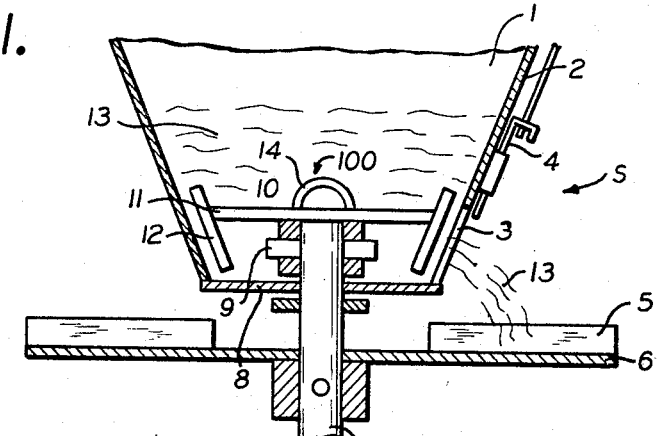
FIG. 1 is an elevation view, partly in section, of a fertilizer spreading apparatus according to a basic embodiment of the invention.

Referring now to FIG. 1, the fertilizer spreading apparatus S has a hopper 1 having a side wall 2 in which a fertilizer discharge orifice 3 is provided. The hopper 1 and discharge orifice 3 thereof are preferably disposed so that the flow of fertilizer through the orifice is aided by gravity, such as for example an orifice 3 located at a position near the bottom of the hopper 1. A slidable gate 4 attached to the hopper 1 on the exterior side thereof is provided for selectively adjusting the effective size and/or shape of the orifice 3.

Underneath the hopper 1 is a spreader plate 6 which is provided with attached slinger blades 5, said plate 6 being rotatably driven by any suitable conventional means (not shown), such as for example, means including a drive shaft 7 operatively connected to said plate 6.

A stirring device 10 is attached to the top of the drive shaft 7 by any conventional means such as for example a cotter pin 9, said drive shaft extending up through the bottom plate 8 of said hopper 1. The stirring device 10 is provided with a crossarm, or ejector means 11 having finger-like pushers 12 affixed to its outer extremities. The pushers 12 can be affixed to the extremities of the ejector means by any suitable conventional means such as by welding.

For simplicity, the hopper 1 is illustrated as being frusto-conical in form with the pushers 12 being disposed so as to project upwardly and downwardly from the ejector means 11 with their longitudinal axes approximately parallel to the hopper wall 2. As will be apparent to those skilled in the art, any other suitable hopper-shape and ejector means 11-pushers 12 arrangement can be substituted. Essentially the ejector means 11 and its pushers 12 act as an impeller, and when rotated move through and stir up the fertilizer 13 within the hopper 1, and by reason of such rotary motion and the aid of gravity cause fertilizer 13 to be fed through the orifice 3 at a controllable flow rate onto the spreader plate 6. The fertilizer 13 is dispensed in a relatively uniform distribution pattern from said spreader plate 6 by the centrifugal force due to its rotation.

A ring 14 is furthermore placed on the top side of the carrier 11 and serves to receive an agitator (not shown) which is required in the case of moist and caking types of fertilizer to provide for a uniform after-flow in the hopper. If, in the case of free-flowing types of fertilizers 13 having fragile grains, the stirring device 10 is not needed, the cotter pin 9 which is preferably tapered need only to be removed by a light pressure or blow on its narrower end, after which the stirring device can be pulled off upwardly, so that all that remains in the hopper 1 is the plain top stub of the drive shaft 7.

Figure 2:
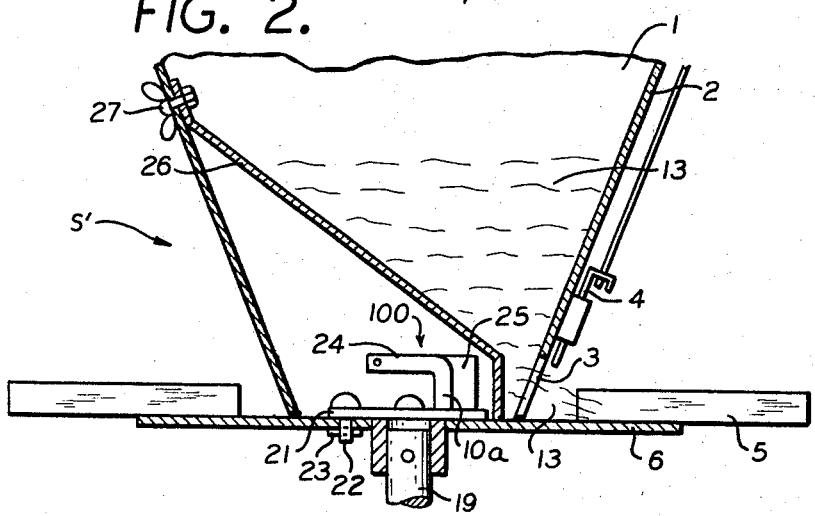
FIG. 2 is an elevation view, partly in section, of a fertilizer spreader according to another embodiment of the invention in which the ejector means is covered by a shroud member, to permit fertilizer flow from the hopper under the influence of gravity alone, and without any stirring.

In the embodiment represented by FIG. 2, the fertilizer discharge orifice 3, which is adjustable by means of the slidable gate closure 4, is likewise disposed in the side wall 2 of the hopper 1. In this centrifugal spreader S', however, the bottom of the hopper 1 is formed by the spreader plate 6 which is equipped with the slinger blades 5 extending beyond its outer margin and which is driven by the shaft 19. The ejector means 10a includes a base plate 21 through which it is fastened to the spreader plate 6 by means of three studs 22, each of which is secured against escaping by a cotter pin 23. The ejector means 10a furthermore comprises a hook 24 serving to receive an agitator (not shown) if necessary, said hook 24 having a vane 25 being fastened by welding to its outer side which serves to advance the fertilizer 13 through the orifice 3. For this reason, the danger of fertilizer grain attrition damage is substantially reduced. Nevertheless, in the case of fertilizers 13 with delicate grains it is expedient to remove the ejector means 10a from the hopper 1. To this end it is necessary only to withdraw the cotter pins 23 from the studs 22, and then the ejector means 10a can be lifted out.

Since, on the one hand, there are a number of types of fertilizer 13 with a high nitrogen content which contain many relatively large grains, and on the other hand the effective size of the orifice 3 may not be adjusted to a size smaller than that of the cross section of the largest size of fertilizer grain without impairing the spreading action, it is sometimes necessary in the centrifugal fertilizer spreader according to the instant invention, for the achievement of low and extremely low rates of fertilizer 13 feed, to exclude from the hopper 1 not only the ejector means 10a but also a portion of the spreader plate 6 which by its rotation also serves to advance the fertilizer 13 through the orifice 3. For this purpose a shroud 26 is fastened to the side wall 2 of the hopper 1 by means of a bolt 27 and covers over the ejector means 10a and most of the spreader plate 6 in the hopper 1.

Figure 3:
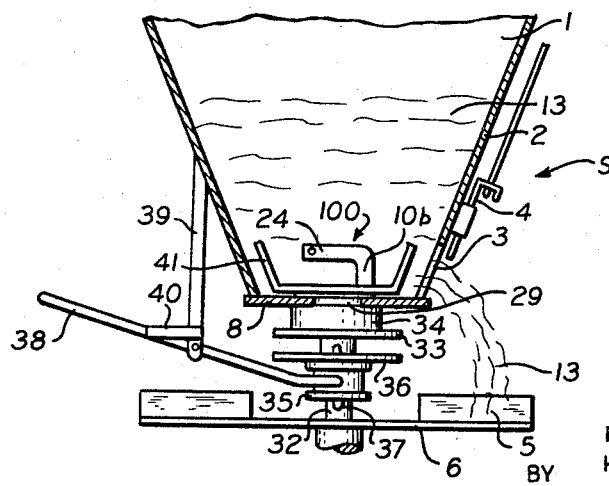
FIG. 3 is an elevation view, partly in section, of a fertilizer spreader according to still another embodiment of the invention in which the ejector means is driven by the spreader plate drive shaft through a clutch.

In FIG. 3 is shown a centrifugal spreader S'' whose ejector means 10b contains a bushing 29 which is brought through the bottom plate 8 of the hopper 1 and serves for rotating the ejector means 10b via the driving shaft 32. A clutch disc 33, mounted to the bushing 29 so as to rotate therewith, is supported against the bottom plate 8 by means of a thrust bearing 34 which takes up the bearing load when said disc 33 is in driving engagement with another clutch disc 36.

On the drive shaft 32, above the spreader plate 6, there is a slidably displaceable clutch body 35 which bears the clutch disc 36 and is coupled with the drive shaft 32 by means of a key 37 so as to be driven by said shaft 32. To rotate the ejector means 10b, the clutch body 35 is raised by means of an operating lever 38 until the clutch discs 33 and 36 are firmly engaged with one another and the spring 40 fastened to the mount 39 of the operating lever 38 and to said lever 38 snaps over the lever 38 and holds it in the engaged position. With the clutch discs 33 and 36 thus engaged, when the drive shaft 32 is rotated, the upwardly bent fingers 41 of the ejector means 10b push the fertilizer 13 in the hopper 1 through the outlet orifice 3, so that it falls onto the spreader plate 6 within the area swept by the slinger blades 5.

In the case of the centrifugal spreader S''' in FIGS. 4 to 6, the outlet orifice 42 is not in the side wall 2 of the hopper 1, but in the bottom plate 45. The effective size and radial position of the center of said orifice 42 can be adjusted by means of the sliding gate 46. The ejector means 10c is provided with a sleeve 48 which is coupled by means of a bayonet connection to the drive shaft 51 which terminates beneath the bottom plate 45. This bayonet connection is achieved by means of offset grooves 49 provided in the sleeve 48 through which a pin 50 extends. At the upper end of sleeve 48 there is mounted a scraper 52 having downwardly bent ends 53 which serve to guide the fertilizer 13 in the hopper 1 to the outlet orifice 42 and at the same time prevent the fertilizer 13 from remaining at a standstill on the bottom plate 45. When the orifice 42 is open, the fertilizer 13 drops onto the spreader plate 6, which is fastened to the drive shaft 51 underneath the hopper 1, and said fertilizer 13 is captured by said spreader plate 6 within the areas thereof swept by the slinger blades 5.

For removal, it is necessary only to lift the ejector means 10c while turning it slightly to follow the offset contour of the slots 49. The opening 56 produced in the bottom plate 45 can then be covered as shown in FIG. 5 by means of a plug 57 which is preferably made of an elastic material. Since after removal of the ejector means 10c, a substantially smaller amount of fertilizer 13 falls from the hopper 1 per unit of time where the adjustment of the size of orifice 42 remains the same, and additional slide gate 58 is disposed on the bottom plate 45, according to FIG. 6, so that the opening 56 which serves to receive the sleeve 48 of the ejector means 10c and which now serves as an additional fertilizer discharge orifice, can be varied in size and thus be used to adjust the rate of fertilizer flow.

Furthermore, a guiding chute 60 is pivotally connected to the mounting 59 of the slide gate 58 by means of a bolt 61. These measures make it possible to compensate for the difference in rate of fertilizer flow after removal of the ejector means 10c, without the need for changing the setting of the gate 46, by appropriately adjusting the effective size of the opening 56. This results in the advantage that, after the ejector means 10c is reinstalled, gate 46 does not have to be readjusted in order to have the spreader S''' operate at the same rate of fertilizer flow as before. Furthermore, this saves the necessity of going over a field twice or more times with the stirring device 10c removed in those cases in which the desired maximum rate of fertilizer flow can be achieved with the ejector means 10c installed only when the orifice 42 is wide open.

To reinstall the ejector means 10c, it is necessary merely to turn chute 60 by 180° to the position 60' which is indicated by broken lines, and to pull slide gate 58 back, so as to permit the sleeve 48 to be inserted through the opening 56.

FIGS. 7 and 8 show a centrifugal spreader apparatus $S^{IV}$ which is somewhat similar in construction to the spreader S'' shown in FIG. 3. The difference between these spreaders $S^{IV}$ and S'' lies primarily in the configuration and arrangement of the ejector means 10d. This stirring device 10d comprises a sleeve 63 which is fastened to a drive shaft 66 underneath the bottom plate 8 by means of a bolt 64 and wing nut 65, and a plane disc 67 which can be cast in one piece with or welded onto said sleeve 63 approximately at its center and above the bottom plate 8. Furthermore, inside of the hopper 1 an additional sleeve 68 shown in FIG. 7 is pushed over the portion of sleeve 63 that projects upward over disc 67, with a pin 69 serving as a coupling means. This pin 69 is secured against escaping by a cotter pin 70.

The sleeve 68 is provided with two arms 71 which project radially outward, each arm 71 having a tap hole 72 which serves for the attachment of vanes 73. On the upper end of sleeve 63, which is closed by a plate 74, is the hook 24 which serves for the attachment, is desired, of an agitator (not shown).

In the complete configuration shown in FIG. 7, the ejector means 10d is suitable for feeding a particularly moist but non-caking type of fertilizer 13 through the orifice 3 onto the spreader plate 6. If a fertilizer having a somewhat lower moisture content is to be distributed, one or both vanes 73 are preferably removed by unscrewing them, so that it is substantially the arms 71 which provide for feeding the fertilizer 13 through the orifice 3.

For types of fertilizer 13 which tend to cake up when driven too hard, but require a certain amount of pressure to get them to flow out from hopper 1, pin 69 is removed and the sleeve 68 with arms 71 is also removed. Then as shown in FIG. 8, pin 69 is put back into sleeve 63 and secured thereto with the cotter pin 70. In this configuration of the stirring device 10d, the fertilizer 13 is moved radially outward by the disc 67, with the head part of pin 69 aiding and urging it through the orifice 3.

If free-flowing types of fertilizers 13 are to be spread with the spreader apparatus $S^{IV}$, pin 69 is also removed, so that disc 67 does all the work of feeding fertilizer 13 through orifice 3.

In the case of very free-flowing types of fertilizers 13 which are capable of flowing from the hopper 1 without any additional driving or stirring, sleeve 63 with disc 67 can also be removed after removing wing nut 65 and pulling out bolt 64. The opening 56 in the bottom plate 8 can then be closed wholly or partially by the means indicated in FIGS. 5 and 6.

Although there are several embodiments of the fertilizer spreading apparatus according to the instant invention, for general usage, the embodiment exemplified by FIG. 7 can be considered as the preferred embodiment, since it can be varied in its ejector means impeller 100 configuration.

For purpose of defining the invention herein, the stirring device can be considered as comprising basically a rotatable drive shaft and an impeller 100 which comprises one or more stirring members assembled to rotate with the drive shaft.

Essentially every element disposed within the hopper 1 which projects radially outward from the ejector means drive shaft can be considered as a stirring member, since when the drive shaft is rotated, such stirring member elements will move through the fertilizer 13 and impart motion to particles thereof. This particular motion which will have radially outward and tangential components will aid the flow of fertilizer 13 through the discharge orifices, 3, 42 (and also 56 in the arrangement of FIG. 6). In the absence of such motion, as for example when the ejector means 10, 10a–d are removed or rendered ineffective as in FIG. 2, the flow of fertilizer 13 from the hopper 1 will be by the aid of gravity alone.

Although the several embodiments of the invention have ejector means 10, 10a–d, with various different impeller 100 configurations with the impellers 100 of the embodiments shown in FIGS. 5 and 6 being removed, or rendered ineffective as in FIG. 2, each embodiment includes a hopper 1 for receiving the fertilizer 13 to be spread, a rotatable spreader plate 6, and means for rotating said spreader plate 6.

The hopper 1 has at least one fertilizer 13 discharge orifice, such as for example orifices 3, 42, and also 56, with each orifice being disposed on the hopper so that the flow of fertilizer 13 therethrough is aided by gravity, whether or not any stirring is provided.

The spreader plate 6 in each case is disposed in underlying spaced relation to the hopper orifices, 3, 42, 56, so as to capture fertilizer 13 flowing therethrough, and to spreadingly dispense or disperse such captured fertilizer when rotated.

Any suitable conventional means (not shown) can be used for rotating the spreader plate 6. For fertilizers 13 which require forces in excess of those provided by gravity to cause a desired fertilizer 13 flow rate from hopper 1, rotatable stirring means such as the ejector means 10, 10a–d are provided within the hopper 1.

These ejector means 10, 10a–d, by reason of their impeller 100 motion, operate to feed fertilizer 13 to and through the discharge orifices 3, 42, 56, and have been found to be effective, even though they do not produce the type of positive fertilizer 13 displacement as would be produced by a worm (not shown), for example.

In each case where an ejector means 10, 10a–d is provided, means for rotating it, and its impeller 100, must likewise be provided. A drive shaft, or its equivalent, such as either of the shafts 7, 19, 32, or the shaft and sleeve combination 48 and 51, 66 and 63, or the clutch and shaft arrangement of FIG. 3 are suitable. The ejector means 10, 10a–d, and its impeller 100 are preferably assembled by releasable connection means, so that the configuration of the impeller 100 can be selectively varied by addition or removal of stirring elements, and if desired, the entire ejector means 10, 10a–d can be removed and replaced.

As will be apparent to those skilled in the art, the fertilizer spreading apparatus of the invention can readily be modified in numerous ways, and the several embodiments and variations thereof set forth herein by way of example, are not to be taken as indicative of any limitations.

What is claimed is:

1. A fertilizer spreading apparatus which comprises:
   (a) a hopper for receiving the fertilizer to be spread, said hopper having at least one fertilizer discharge orifice, said orifice being disposed on the hopper so that the flow of fertilizer therethrough is aided by gravity;
   (b) a rotatable spreader plate in underlying relationship to said hopper orifice, positioned to capture fertilizer flowing through said orifice and to spreadingly distribute such by centrifugal force;
   (c) a drive shaft connected to said spreader plate adapted to rotate such and extending at least to the bottom of said hopper;
   (d) easily engageable and disengageable ejector means within said hopper disengagingly engaged to said shaft through engagement means at least partially outside said hopper, which ejector means is adapted to be rotated by said shaft when such is engaged thereto;
   (e) and means for rotating said drive shaft.

2. The apparatus according to claim 1 wherein said spreader plate rotating means includes a rotatable drive shaft connected to said spreader plate to rotate same relative to said hopper, and including a clutch connected to said spreader plate drive shaft and to said impeller drive shaft to selectively transmit rotary power from the former to the latter to selectively rotate said impeller and spreader plate in unison, and to rotate said spreader plate without rotating said impeller.

3. The apparatus according to claim 1 wherein said hopper has an open bottom and said spreader plate is disposed for rotation in adjacent relation to hopper edges establishing the lateral boundaries of said open bottom to prevent downward flow of fertilizer therethrough and to impart motion to fertilizer within the hopper to assist the outward flow of fertilizer therefrom through a discharge orifice located on a side wall of said hopper, said orifice being positioned to discharge fertilizer onto portions of said spreader plate extending beyond the lateral boundaries of the hopper bottom, and including a selectively removable shroud member disposed within said hopper to enclose said stirring means to prevent same from coacting with fertilizer within the hopper.

References Cited

UNITED STATES PATENTS

| | | | |
|---|---|---|---|
| 1,166,477 | 1/1916 | Parrish | 275—15 |
| 2,535,414 | 12/1950 | Heidger | 275—8 |
| 2,594,084 | 4/1952 | Skibbe et al. | 275—3 |
| 3,109,657 | 11/1963 | Dreyer et al. | 275—8 |

FOREIGN PATENTS 159,534  10/1954  Australia.

ABRAHAM G. STONE, *Primary Examiner.*

J. R. OAKS, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,915                 October 22, 1968

Heinz Dreyer

It is certified that error appears in the above identified patent and that said Letters Patent are hereby corrected as shown below:

Column 1, lines 23 and 24, 26, 27 and 28, 33, 34, and 38, column 2, line 33, column 3, lines 18, 50, and 53, column 4, lines 5, and 8, column 5, lines 44 and 45, and 59, and column 6, lines 15 and 37, "stirring device", each occurrence, should read -- ejector means --.

Signed and sealed this 3rd day of March 1970.

(SEAL)

Attest:

Edward M. Fletcher, Jr.                WILLIAM E. SCHUYLER, JR.

Attesting Officer                        Commissioner of Patents